United States Patent
Shin et al.

(10) Patent No.: US 12,480,966 B2
(45) Date of Patent: Nov. 25, 2025

(54) LIQUID HANDLING SYSTEM

(71) Applicant: ABLE Labs Inc., Incheon (KR)

(72) Inventors: Sang Shin, Incheon (KR); Nam Il Ko, Incheon (KR); Sang Young Park, Gyeonggi-do (KR)

(73) Assignee: ABLE Labs Inc., Incheon (KR)

( * ) Notice: Subject to any disclaimer, the term of this patent is extended or adjusted under 35 U.S.C. 154(b) by 611 days.

(21) Appl. No.: 17/891,011

(22) Filed: Aug. 18, 2022

(65) Prior Publication Data
US 2023/0053912 A1    Feb. 23, 2023

(30) Foreign Application Priority Data
Aug. 20, 2021 (KR) .......... 10-2021-0110184

(51) Int. Cl.
*G01N 35/10* (2006.01)
*B01L 3/02* (2006.01)
*G01N 35/00* (2006.01)
*G01N 1/00* (2006.01)

(52) U.S. Cl.
CPC ........ *G01N 35/1002* (2013.01); *B01L 3/0234* (2013.01); *B01L 3/0237* (2013.01); *G01N 35/0099* (2013.01); *G01N 35/1009* (2013.01); *G01N 2001/002* (2013.01)

(58) Field of Classification Search
None
See application file for complete search history.

(56) References Cited

U.S. PATENT DOCUMENTS

| | | | |
|---|---|---|---|
| 2005/0268000 A1* | 12/2005 | Carlson ............... | G06F 13/4081 710/15 |
| 2017/0197205 A1* | 7/2017 | Fetz ...................... | B01L 3/0237 |
| 2019/0195906 A1* | 6/2019 | Müller .................. | B01L 3/0275 |

FOREIGN PATENT DOCUMENTS

| | | | | |
|---|---|---|---|---|
| EP | 2957915 A1 * | 12/2015 | ......... | G01N 35/0099 |
| JP | 2001-33463 | 2/2001 | | |
| JP | 2021-509173 | 3/2021 | | |
| KR | 10-2009-0107927 | 10/2009 | | |
| KR | 10-2015-0081178 | 7/2015 | | |
| KR | 10-2018-0132142 | 12/2018 | | |
| KR | 10-2369417 | 3/2022 | | |

* cited by examiner

*Primary Examiner* — Maris R Kessel
*Assistant Examiner* — May Leung Chiu
(74) *Attorney, Agent, or Firm* — WOMBLE BOND DICKINSON (US) LLP

(57) ABSTRACT

An automated liquid handling system includes a transfer robot unit, a handling module, and a fixing unit which is coupled to a head of the robot unit and on which a pipette assembly is to be mounted, wherein the handling module is provided with a mounting part detachably mounted on the fixing unit. The fixing unit includes a body part, a fixing part hook formed at an upper portion of one side of the body part and a lower protrusion disposed at a lower portion of the one side of the body part, the mounting part includes a body, a movable hook part formed at an upper portion of one side of the body and a lower groove formed at a lower portion of the one side of the body to correspond to the lower protrusion, a catching step is formed at the lower groove, and the lower protrusion extends from the lower portion of the one side of the body part to support the catching step from below, and the movable hook part is hook-coupled to a fixing unit hook.

6 Claims, 8 Drawing Sheets

LIQUID HANDLING SYSTEM

CROSS-REFERENCE TO RELATED APPLICATION

This application claims priority to and the benefit of Korean Patent Application No. 10-2021-0110184 filed on Aug. 20, 2021, the disclosure of which is incorporated herein by reference in its entirety.

BACKGROUND

1. Field of the Invention

The present disclosure relates to a liquid handling system, and more particularly, to an automated liquid handling system in which a handling module is easily detachably provided.

2. Discussion of Related Art

Automated liquid handling systems are experimental automation apparatuses designed for convenient washing, dilution, incubation, dispensing, labware movement, and the like so that a large amount of samples can be processed efficiently at a high speed in the field of new material development, new drug R&D, and the like. As tests that require precision and include a microplate filling operation as well as complex multi-step pipetting operations such as a plate reformatting operation, a stamping operation, and a serial dilution operation used in a biotechnology experiment or overall manufacturing are automated, the tests can be repeatedly performed with minimum manpower and an error of an experimental result can be minimized.

The automated liquid handling systems may be used in various experiments and systems for drug discovery, genetic analysis, sample preparation, and quality control/assurance.

In particular, when the automated liquid handling system (for example, a robotic liquid handler) equipped with a multi-channel pipette assembly is used, as a plurality of samples may be simultaneously dispensed using a plurality of channels, high-speed processing can be stably performed. The automated liquid handling system aids or replaces a worker who performs a repeated work of sending a small amount of liquid to the plurality of channels between determined containers, by improving quantitative handling, process speed, and efficiency of liquid.

The automated liquid handling system includes a robot unit (or a three-dimensional transfer mechanism) that performs a three-dimensional motion to transfer a predetermined amount of liquid, a pipette assembly that is coupled to the robot unit and is automatically transferred according to a program, and a controller that includes a memory for storing the program and controls operation of the robot unit and the pipette assembly. The pipette assembly includes an electric driving unit (for example, a step motor), a syringe operated by the electric driving unit, a pipette probe coupled to one end of the syringe, and a pipette tip that is coupled to the pipette probe. The pipette tip suctions, holds and discharges liquid in a container array is by action of the syringe.

A liquid pipette device may be adapted to the various liquid handling systems. In addition, the liquid pipette device may be provided with, according to usage, various corresponding pipette assemblies, for example, a single-channel pipette assembly to which one pipette tip is coupled and/or a multi-channel pipette assembly in which a plurality of pipette tips are arranged. Instead of the pipette assembly, another handling module such as a gripper may be coupled to a robot arm and thus automatically transfer the liquid container and so on.

However, the handling module, for example, the pipette assembly, should be physically coupled to the robot unit to be transferred together with the robot unit, and an electric connection with an external power supply is also required to operate the electric driving unit (for example, a step motor) disposed inside the pipette assembly to suction the liquid into the pipette tip and discharge the liquid.

In a conventional liquid handling system, a fastening screw is used to physically couple the robot unit and the pipette assembly, and a cable is used for electrically connecting a driving unit and a printed circuit board (PCB) in the pipette assembly.

However, this conventional screw fastening method has problems in that attachment/detachment is difficult or a long time is consumed for the attachment/detachment, and the fastening is loosed due to vibrations of the step motor, backlash, and the like when the system is repeatedly used. Furthermore, since the pipette assembly has a considerable weight, it is difficult to stably couple the pipette assembly to the robot unit and perform precise position control.

Further, as an electric cable for electrical connection to the pipette assembly is used, the cable is degraded due to repeated twisting, there is concern about contamination of liquid in a lower container or a well plate, and management of the system is difficult.

(Patent Document 1) Japanese Patent No. 2021-509173

SUMMARY OF THE INVENTION

The present disclosure is directed to providing an automated liquid handing system having excellent user convenience and easy attachment/detachment.

The present disclosure is directed to also providing an automated liquid handing system in which electrical and mechanical coupling is stabilized, and at the same time, attachment/detachment is easy.

According to an aspect of the present disclosure, there is provided an automated liquid handling system including a 3-axis transfer robot unit, a handling module, and a fixing unit which is coupled to a head of the robot unit and on which the handling module is to be mounted, wherein the handling module is provided with a mounting part detachably mounted on the fixing unit. The handling module may be one of various modules, such as a single-channel pipette assembly, multi-channel pipette assembly or a gripper, that may be coupled to the head of the robot unit.

The fixing unit may include a body part, a fixing unit hook formed at an upper portion of one side of the body part, and a lower protrusion disposed the one side of the body part, and the mounting part includes a body, a movable hook part formed at an upper portion of one side of the body, and a lower groove formed below or at lower portion of the one side of the body to correspond to the lower protrusion.

The lower protrusion extends in horizontal direction below the one side of the body part or at lower portion of the one side of the body part.

A catching step may be formed at the lower groove, the lower protrusion extends from a lower portion of the one side of the body part to support the catching step from a lower side, and the movable hook part may be hook-coupled to the fixing unit hook.

A catching boss protruding upward may be formed at an end of the lower protrusion, the catching boss may be inserted into a catching groove of the mounting part and may be in contact with the catching step, and thus horizontal movement of the mounting part is limited.

A fixing unit connector for electrical connection with the mounting part may be disposed on the one side of the body part between the fixing unit hook and the lower protrusion, a mounting part connector is disposed on the one side of the body between the movable hook part and a lower groove mounting part to correspond to the fixing unit connector, and when the hook coupling is performed, the fixing unit connector and the mounting part connector are coupled.

A positioning groove may be formed between the fixing unit hook and the lower protrusion, and a positioning boss may be formed on the one side of the body to correspond to the positioning groove.

The lower groove may be formed at a lower portion of one side of the mounting part to accommodate one end of the lower protrusion therein, the catching step may protrude downward from an upper end of the lower groove, and a catching groove may be formed in a rear surface of the catching step. The lower protrusion may extend to support the catching step formed on one side of a lower portion of the mounting part in a state in which the mounting part is mounted, and a catching boss at an end of the lower protrusion may be inserted into the catching groove in the rear surface of the catching step, may support the mounting part from below, and may be seated.

The handling module may include a motor driving unit, and when the handling module is mounted on the fixing unit, connector coupling may be performed without a separate cable so that electrical connection is performed, and the motor driving unit may be connected to a motor controller through a connector and may be driven by control of the motor controller.

The handling module may include a voltage adjustment unit. When the handling module is mounted on the fixing unit, connector coupling may be performed without a separate cable so that electrical connection is performed, the voltage adjustment unit may be connected to a reference voltage supply unit and a module information reception unit through a connector to constitute a closed circuit, and the voltage adjustment unit receives a reference voltage from the reference voltage supply unit through the connector, applies a module identification voltage to the module information reception unit according to a type of an individual handling module, and thus identifies a mounted handling module.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. In the following embodiment, a pipette assembly is exemplified as a handling module detachably coupled to a transfer device such as a robot arm, but the present disclosure is not limited thereto. A structure of a liquid handling system of the present disclosure may also be applied to another handling module such as a gripper instead of the pipette assembly.

Figure 1:
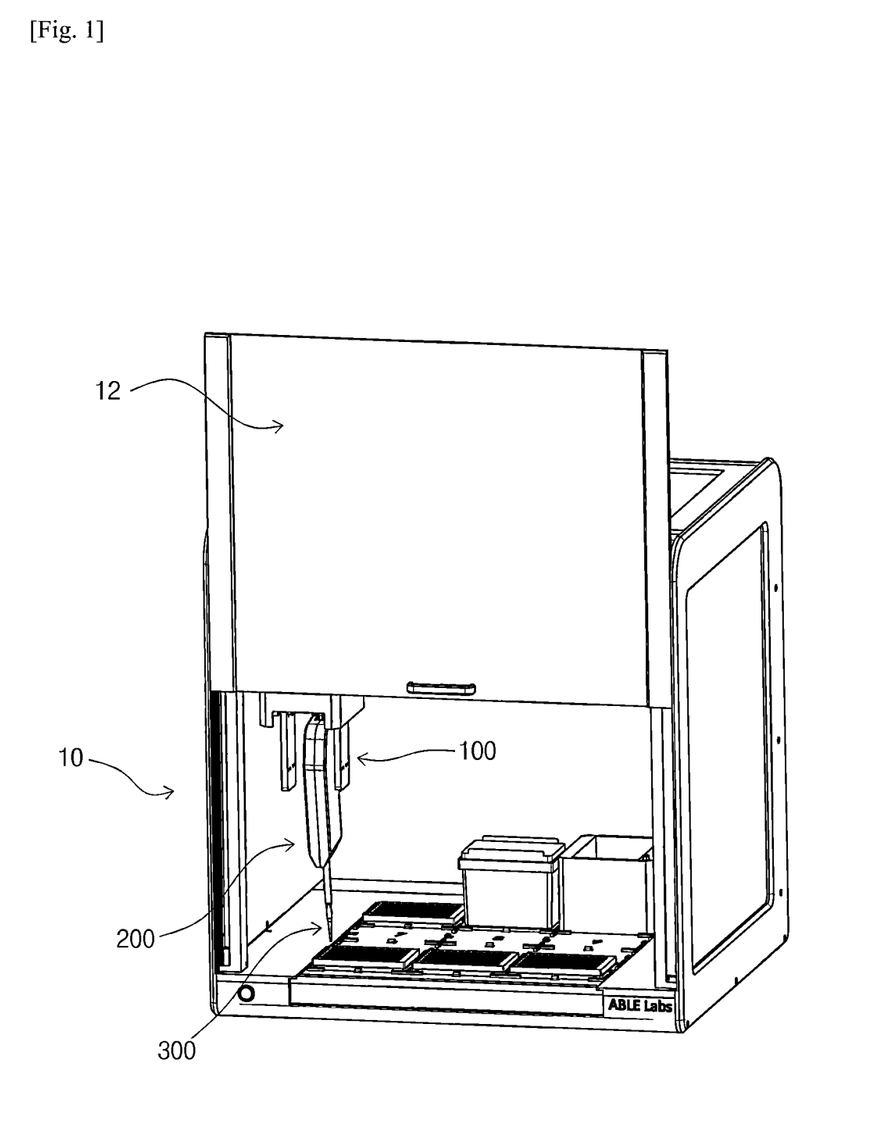
FIG. 1 is a perspective view illustrating an automated liquid handling system according to an embodiment of the present disclosure.

FIG. 1 is a perspective view illustrating a liquid handling system 1 according an embodiment of the present disclosure. The liquid handling system 1 according to the embodiment of the present disclosure includes a robot unit disposed in a case 10, a fixing unit 100 at one end of the robot unit, a pipette assembly 200 mounted on the fixing unit 100, and a slide openable door 12. A pipette tip array container, a sample plate, and the like may be installed on the deck at lower portion of the case 10.

The robot unit generally includes an XY-Gantry that performs two-dimensional movement in a horizontal direction and a Z-axis driving part that performs vertical movement. The pipette assembly 200 is mounted on the fixing unit 100 coupled to a head of the robot unit to transport a liquid sample in a three-dimensional space. The pipette assembly 200 is easily detachably coupled to the fixing unit 100. In this way, various types of pipette assemblies suitable for the purpose may be detached or coupled frequently and used.

Figure 2:
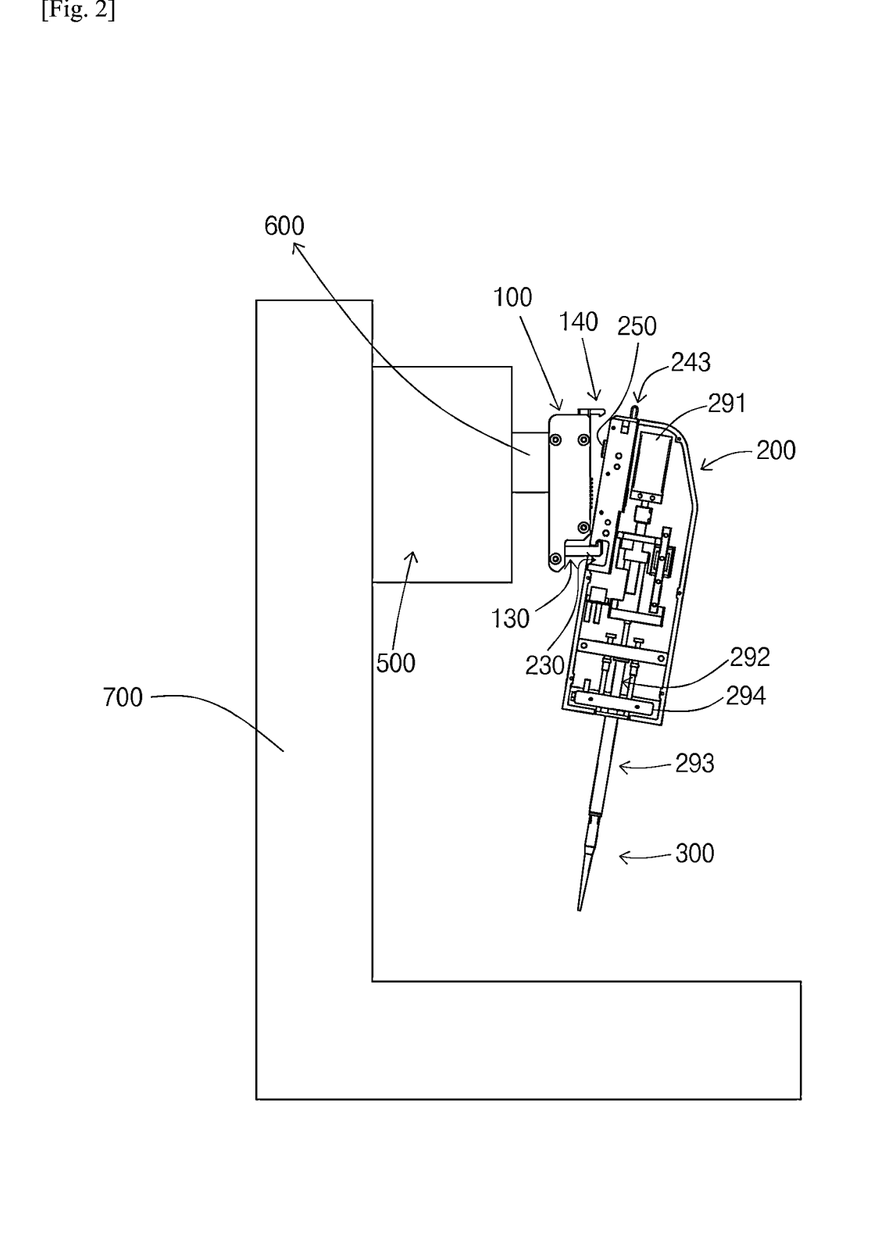
FIG. 2 is a schematic side cross-sectional view illustrating arrangement of a transfer unit and a pipette assembly of the automated liquid handling system according to an embodiment of the present disclosure.

FIG. 2 is a schematic side cross-sectional view illustrating arrangement of a transfer unit and the pipette assembly 200 of the automated liquid handling system according to an embodiment of the present disclosure. The XY-Gantry (not illustrated) that two-dimensionally moves in the horizontal direction with respect to a frame 700 fixed to the handling system is provided so that a horizontal movement unit 500 moves in the horizontal direction. A robot head 600 that performs a vertical Z-axis movement is coupled to the horizontal movement unit 500, the fixing unit 100 is fixed to the robot head 600, and the pipette assembly 200 is detachably coupled to the fixing unit 100.

Figure 3:
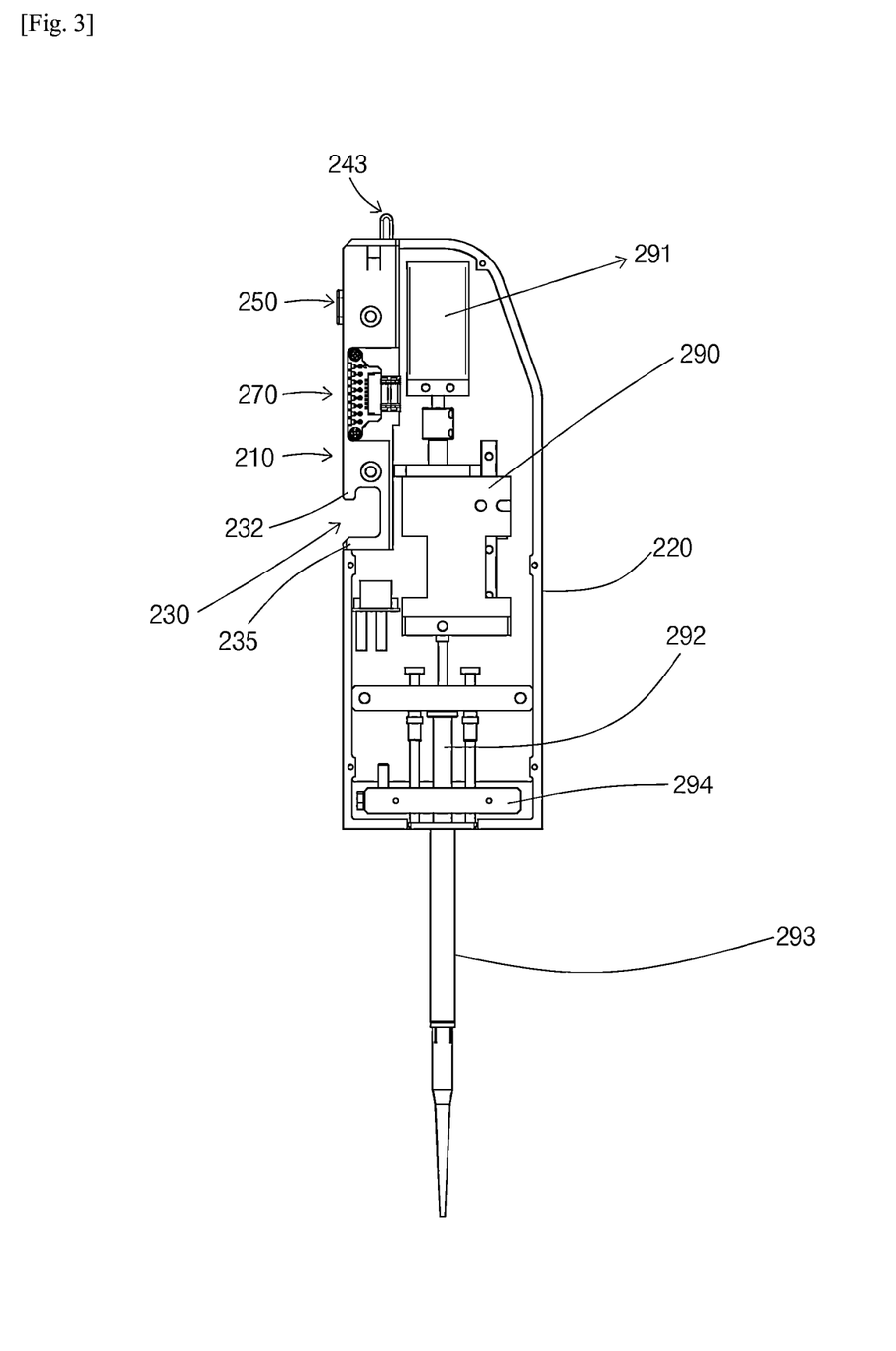
FIG. 3 is a cross-sectional view illustrating an internal structure of the pipette assembly of the automated liquid handling system according to an embodiment of the present disclosure.
Figure 4:
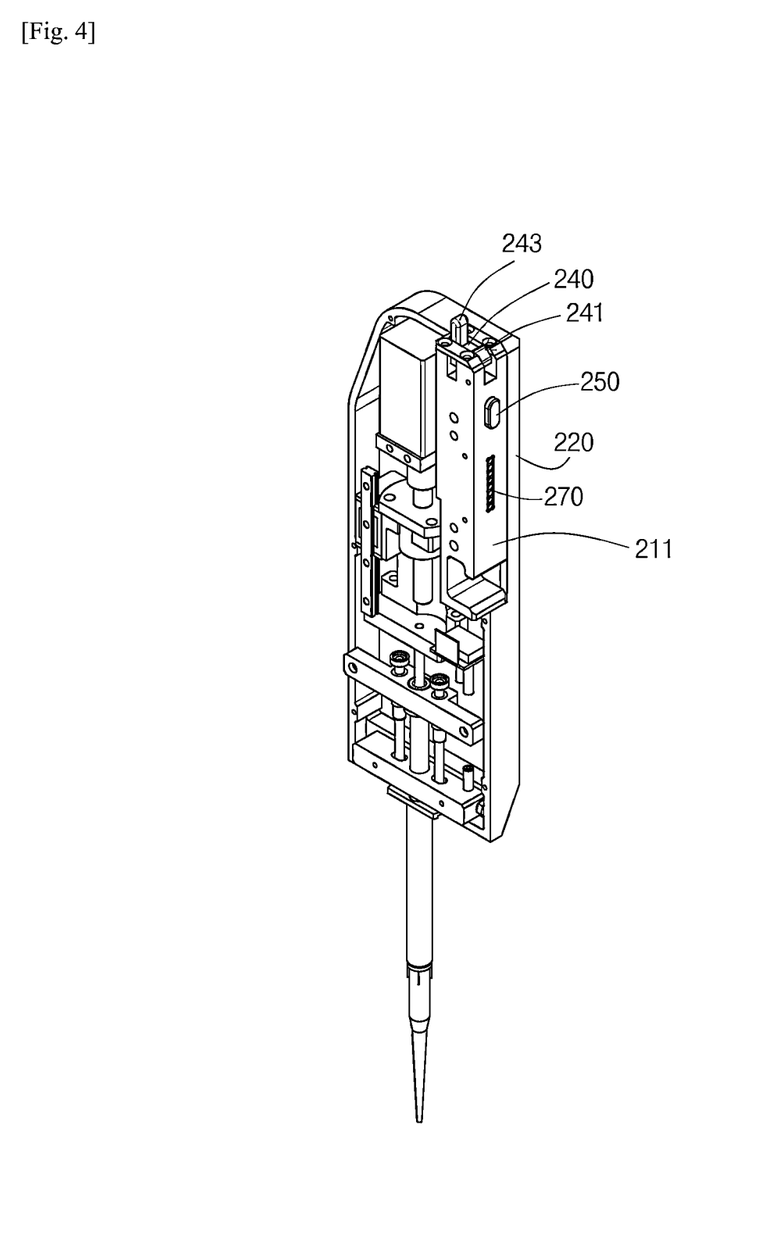
FIG. 4 is an exploded perspective view illustrating the internal structure of the pipette assembly of the automated liquid handling system according to the embodiment of the present disclosure.

FIG. 3 is a cross-sectional view illustrating an internal structure of the pipette assembly 200 of the automated liquid handling system according to an embodiment of the present disclosure. The pipette assembly 200 is provided with a step motor 291 for supplying driving energy for suctioning/discharging a liquid, a pump 290 that is operated by the step motor, a syringe 292, a manifold 294 coupled to the syringe 292, a pipette probe 293 on which a pipette tip is to be mounted, and the like. The liquid is suctioned and discharged through a pipette tip 300 mounted on the pipette probe 293 through operation of the pump 290 and the syringe 292 by operation of the step motor driven by a separate control module. A mounting part 210 to be mounted on the fixing unit 100 is provided on one side of an upper portion of the pipette assembly 200.

The fixing unit 100 fixed to the robot head 600 moves integrally with the robot head 600, and the pipette assembly 200 mounted on the fixing unit 100 also moves according to three-dimensional movement of the robot head 600. In order to accurately perform a liquid dispensing operation, the mounting part 210 should be stably and precisely coupled to the fixing unit 100.

Hereinafter, referring to FIGS. 2 to 7, a structure in which the mounting part 210 of the liquid handling system according to the embodiment of the present disclosure is detachably coupled to the fixing unit 100 will be described in detail.

Figure 6:
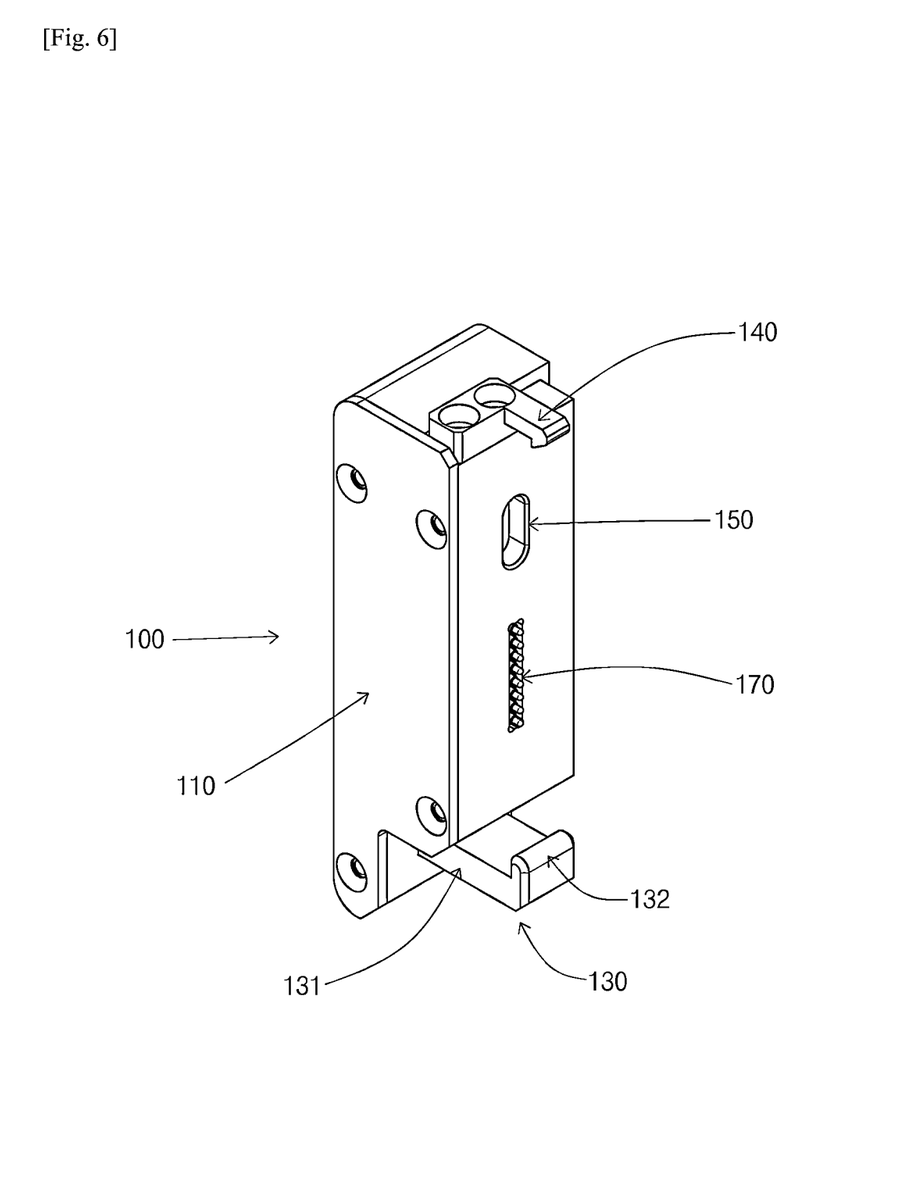
FIG. 6 is a perspective view of a fixing unit (100) on which the pipette assembly is to be mounted in the automated liquid handling system according to the embodiment of the present disclosure.

First, referring to FIG. 6, in description of the fixing unit 100, the fixing unit 100 is formed integrally with the robot head 600 or fixedly coupled to the robot head 600. The fixing unit 100 includes a body part 110, a fixing unit hook 140 protruding from one side of the body part 110, and a lower protrusion part 130. A connector 170 and a positioning groove 150 are vertically arranged between the fixing unit hook 140 and the lower protrusion part 130 arranged on upper and lower sides of one surface of the body part 110.

The lower protrusion part 130 is formed to extend in the horizontal direction below the one side of the body part 110 and, and a catching boss 132 is formed to protrude upward from an end of the lower protrusion part 130. The lower protrusion part 130 extends to support a catching step 232 formed on one side of a lower portion of the mounting part 210 in a state in which the mounting part 210 is mounted, and the catching boss 132 at one end of the lower protrusion part 130 is inserted into a catching groove 233 in a rear surface of the catching step 232, supports the mounting part 210 from below, and is seated.

Figure 7:
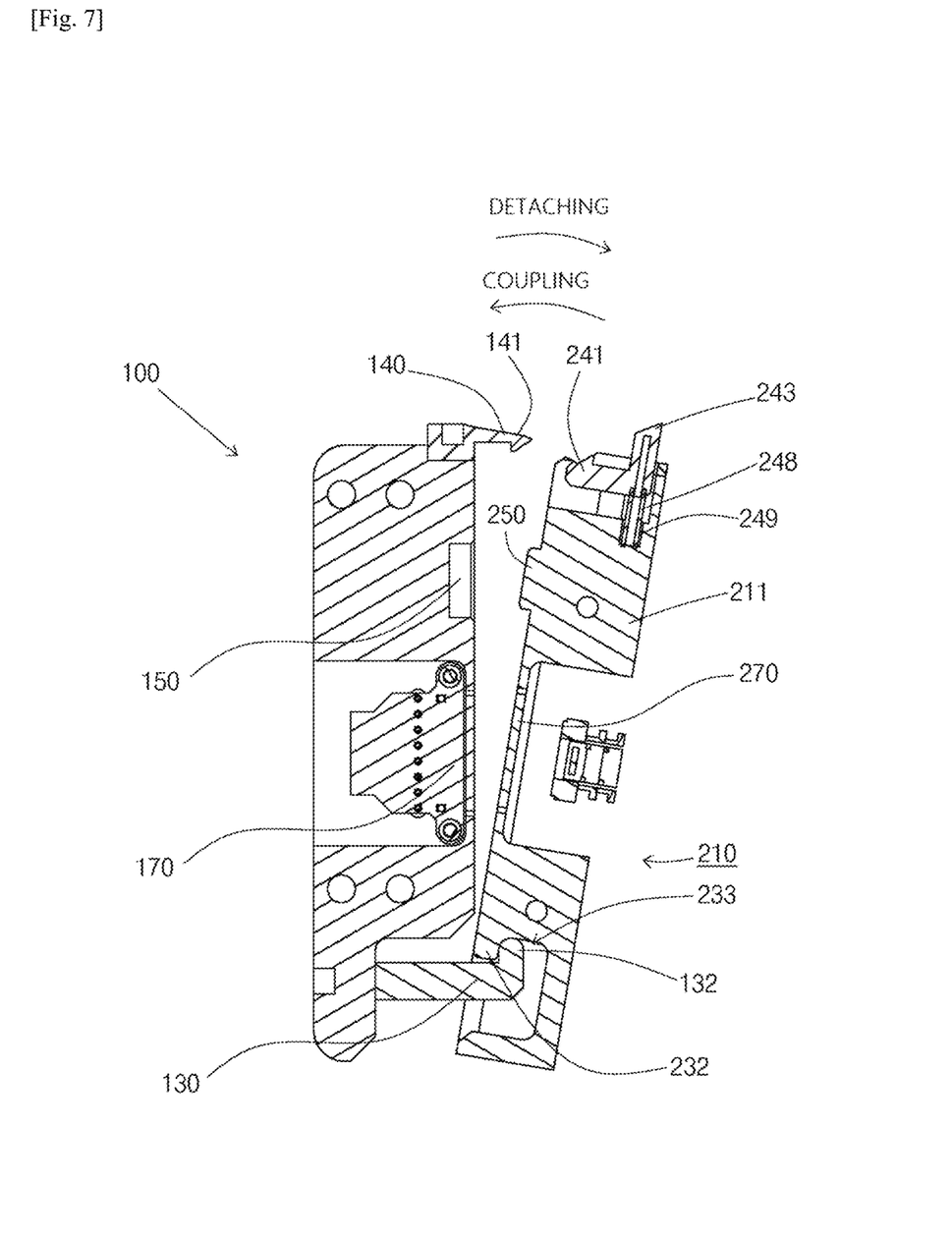
FIG. 7 is a side cross-sectional view illustrating relative arrangement of the pipette assembly in a state in which the pipette assembly is mounted on or detached from the fixing unit (100) in the automated liquid handling system according to the embodiment of the present disclosure.

The lower protrusion part 130 may be integrally formed below the one side of the body part 110 or may be fixedly coupled to the one side of the body part 110 as a separate part. As illustrated in FIGS. 6 and 7, a lower portion of the body part 110 may be thin to be stepped.

The fixing unit hook 140 horizontally extending in a direction parallel to the lower protrusion part 130 from an upper portion of the body part 110 is formed integrally with the body part 110 or fixedly coupled to the body part 110 in a manner such as screw coupling.

The connector 170 and the positioning groove 150 for electrical connection with the mounting part 210 are vertically arranged on the one side of the body part 110 between the fixing unit hook 140 and the lower protrusion part 130. It is preferable that the connector is a pogo pin connector.

The mounting part 210 is provided at an upper end of one side of the pipette assembly 200 to be detachably coupled to the fixing unit 100. Referring to FIG. 2, the mounting part 210 is provided at an upper end of a front side of the pipette assembly 200 and serves to detachably mount the pipette assembly 200 on the fixing unit 100.

A structure of the mounting part 210 of the pipette assembly 200 will be described in detail with reference to FIGS. 2 to 5. The mounting part 210 includes a body 211, a movable hook part disposed at an upper end of the body 211 to correspond to the fixing unit hook 140, and a mounting part connector 270 and a positioning protrusion 250 formed on the one side of the body 211 to correspond to the fixing unit connector 170 and the positioning groove 150. A lower groove 230 and a catching step 232 are formed on one side of a lower portion of the body 211 to correspond to the lower protrusion part 130 and the catching boss 132.

Referring to FIG. 7, a coupling structure corresponding to the lower protrusion part 130 and the catching boss 132 of the fixing unit 100 is the lower groove 230 and the catching step 232 of the mounting part 210. The lower groove 230 is a groove formed in a lower portion of one side of the mounting part 210 and serves to accommodate one end of the lower protrusion part 130 therein. The catching step 232 extending to protrude downward is formed at an upper end of the lower groove 230, and the catching groove 233 is naturally formed in the rear surface of the catching step 232.

When the catching step 232 and the catching groove 233 are coupled to the catching boss 132 of the fixing unit 100, the catching step 232 is seated in front of the catching boss 132 of the lower protrusion part 130 so that the mounting part 210 does not fall down by its own weight. That is, the lower protrusion part 130 of the fixing unit 100 supports the catching step 232 of the mounting part 210 from the lower side, and the catching boss 132 inserted into the catching groove 233 serves to prevent the catching step 232 from moving in the horizontal direction so as not to be separated rearward.

Figure 5:
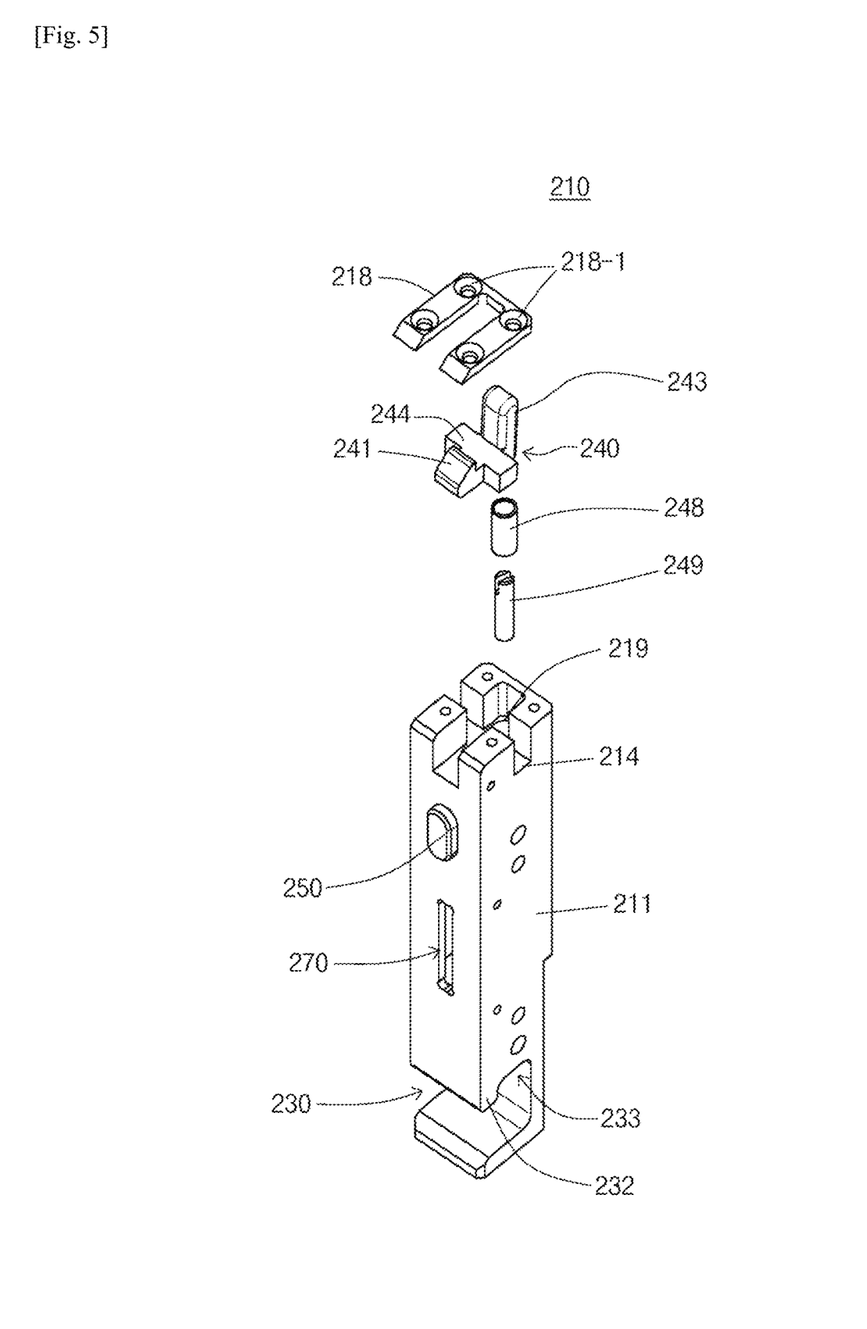
FIG. 5 is an exploded perspective view of a mounting part of the pipette assembly to be mounted on a robot unit of the automated liquid handling system according to the embodiment of the present disclosure.

Referring to FIGS. 5 and 7, the movable hook part 240 of the mounting part 210 is a coupling structure corresponding to the fixing unit hook 140 at an upper portion of the fixing unit 100. A cross-section of the movable hook part 240 has substantially a cross shape. The movable hook part 240 includes a pushing part 243 extending upward from a rear side thereof, a pair of guide bosses 244 extending in a left-right direction, and a mounting part hook 241 located on a front side thereof. The mounting part hook 241 is formed to correspond to the fixing unit hook 140, and when the mounting part hook 241 is coupled to the fixing unit hook 140, the mounting part 210 is fastened to the fixing unit 100 through mutual hook coupling.

Referring to FIG. 5, a guide groove 214 is formed above the body 211 to guide vertical movement of the movable hook part 240. The guide boss 244 of the movable hook part 240 vertically moves along the guide groove 214. A spring 248 and a pin 249 are coupled to a lower end of the movable hook part 240, and thus the movable hook part 240 receives an upward spring force. While pushing an upper end of the movable hook part 240, a stopper 218 is assembled to an upper portion of the mounting part 210 to limit an uppermost location of the movable hook part 240. When the pushing part 243 is pushed by a hand, the movable hook part 240 moves downward, and when the pushing part 243 is released from the hand, the movable hook part 240 returns to an uppermost location by a force of the spring 248. When the mounting part 210 is detached from the fixing unit 100, the pushing part 243 is pushed to release the hook coupling.

Meanwhile, the fixing unit 100 and the mounting part 210 are each provided with a connection for mutual electrical connection. Electrical connection is required for power supply and control of the step motor 291 provided in the mounting part 210. The fixing unit connector 170 in the fixing unit 100 and the mounting part connector 270 in the mounting part 210 are coupled to each other to achieve electric connection. For stable electrical connection, it is preferable that the connectors 170 and 270 are arranged between the structures 140 and 240 for the hook coupling at an upper end and the structures 130, 132, 230, 232, and 233 for the catching step coupling at a lower end.

In order to ensure that the mounting part 210 is constantly coupled to the fixing unit 100 at a predetermined location when the mounting part 210 is coupled to the fixing unit 100, the positioning groove 150 is formed in the fixing unit 100, and the positioning protrusion 250 is formed in the mounting part 210. While the positioning groove 150 and the positioning protrusion 250 are fitted with each other, a relative location in up-down and left-right directions is restricted. Due to these positioning devices, even when the pipette assembly 200 is frequently detached or coupled, stable and precise liquid handling can be performed. Further, mutual fastening between the electrical connectors is also stably performed.

Hereinafter, a mechanism according to an embodiment of the present disclosure for coupling or detaching various liquid handling modules such as the pipette assembly and the gripper to the fixing unit 100 of the robot head 600 will be described. FIG. 7 illustrates, to describe a mounting mechanism, only a cross-section of a state in which the mounting part 210 of the handling module starts to be mounted on the fixing unit 100 is illustrated.

Referring to FIG. 7, while coupling surfaces of the fixing unit 100 and the mounting part 210 correspondingly approach each other, the rear surface of the catching step 232 of the mounting part 210 comes into contact with a front side of the catching boss 132 of the lower protrusion part 130 of the fixing unit 100, and thus the catching boss 132 of the lower protrusion part 130 supports the catching step 232 from a downward direction and the horizontal direction. In this case, the catching boss 132 is in a state of being inserted into the catching groove 233 through the lower groove 230.

In this way, the catching step 232 of the mounting part 210 is supported by the catching boss 132 of the lower protrusion part 130 of the fixing unit 100, a contact portion between the catching step 232 and the catching boss 132 is a rotational center of the mounting part 210, and thus movement in the vertical direction and the horizontal direction is limited. In this case, an upper end of the mounting part 210 rotates about the contact portion, and thus the mounting part hook 241 of the movable hook part 240 is hook-coupled to the fixing unit hook 140.

That is, the catching step 232 below the mounting part 210 is supported by the catching boss 132 of the lower protrusion part 130 of the fixing unit 100, the horizontal movement of the catching step 232 is limited, and the mounting part hook 241 at the upper end of the mounting part 210 is hook-coupled to the fixing unit hook 140. At the same time, electrical coupling by an electric connector is also made between a hook coupling part and a lower catching step coupling part.

Meanwhile, a process of detaching the mounting part 210 from the fixing unit 100 by releasing the hook coupling is also very simple. When a user pushes the pushing part 243 of the movable hook part 240, the hook coupling is released, and when the lower catching step 232 is slightly pulled upward after the mounting part 210 rotates in a detachment direction, the mounting part 210 may be detached. In this way, using a simple manner, various handling modules may be easily mounted or detached, thereby achieving easy replacement.

According to the embodiment of the present disclosure, the liquid handling system includes a fixing unit that is fixed to and moves integrally with a head of a three-dimensional transfer robot and a handling module that has a mounting part detachably mounted on the fixing unit and is detachably mounted on the fixing unit by the mounting part. The hook coupling is performed by the movable hook part and the fixing unit hook at the upper ends of the fixing unit and the mounting part, the catching step coupling is performed at the lower portion in which the lower protrusion and the lower groove are formed, and thus the mounting part is fastened to the fixing unit. Therefore, the mounting part is stably coupled to the three-dimensional transfer robot head, and at the same time, is easily detached therefrom through the dual coupling including the upper end hook coupling and the lower catching step coupling, and thus user convenience is excellent, and a liquid handling process is performed precisely and stably.

In addition, various handling modules by such replacement may be electronically controlled and displayed to be distinguished from each other. An ID of a specific handling module may be displayed on an external separate controller and a user interface (for example, a display). To this end, a signal, for example, a specific voltage or waveform signal, which is stored in an electronic circuit disposed in the handling module, may be transferred to the controller when a specific handling module is mounted. In this manner, the handling module can be more easily distinguished.

Figure 8:
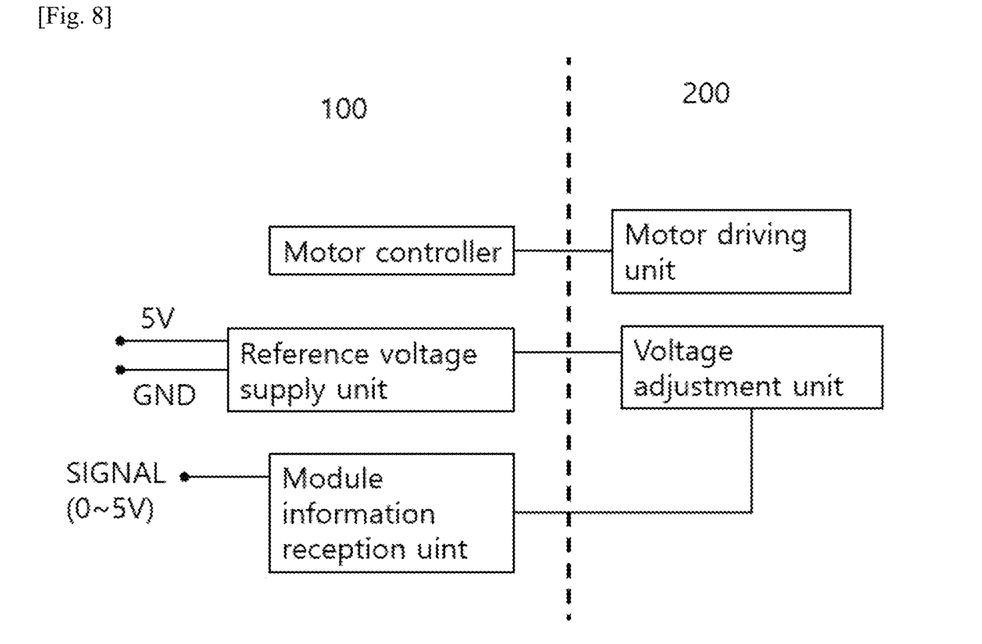
FIG. 8 is a schematic view illustrating electrical connection and a signal circuit of the automated liquid handling system according to the embodiment of the present disclosure.

Referring to FIG. 8, the handling module, for example, the pipette assembly 200, is provided with a motor driving unit and a voltage adjustment unit, and the fixing unit 100 includes a motor controller, a reference voltage supply unit, and a module information reception unit. Alternatively, the motor controller, the reference voltage supply unit, and the module information reception unit may be provided in another device and connected to the fixing unit connector 170 of the fixing unit.

The motor driving unit may be the step motor 291, and the voltage adjustment unit may be a circuit included in a printed circuit board (PCB) in the pipette assembly 200. For example, the voltage adjustment unit may be an electric circuit included in the PCB provided in the mounting part 210 of the pipette assembly 200.

When the mounting part 210 of the pipette assembly 200 is mounted on the fixing unit 100, the mounting part connector 270 is electrically and physically connected to the fixing unit connector 170. In this case, the voltage adjustment unit receives a reference voltage from the reference voltage supply unit through the connectors 170 and 270 and reduces the suppled voltage to a discrete voltage between 1 V to 5 V by voltage distribution. A module identification voltage is predetermined so that output voltages are different according to modules and thus a circuit is configured to identify a mounted module. For example, a circuit is configured such that a first pipette assembly outputs a predetermined module identification voltage of 1 V and a second pipette assembly outputs a predetermined module identification voltage of 2 V.

In this manner, a module information reception unit can detect a module identification voltage output from the voltage adjustment unit to identify a mounted module. Further, when the module is not mounted, a voltage signal of 0 V is applied to the module information reception unit, and thus whether the module is mounted can be also identified. Individual module information is output to a user interface (not illustrated) such as a display according to the module identification voltage detected by the module information reception unit.

According to a liquid handling system of the present disclosure, since a pipette assembly is easily detachably attached to a transfer robot unit of an automated liquid handling system, user convenience is improved.

In the automated liquid handling system of the present disclosure, the mounted pipette assembly is stably held, and thus a liquid handling process can be performed precisely and stably.

What is claimed is:
1. An automated liquid handling system comprising:
a transfer robot unit;
a fixing unit fixed to the transfer robot unit to move integrally with the transfer robot unit; and
a handling module which has a mounting part to be detachably mounted on the fixing unit and is configured to be detachably installed on the fixing unit by the mounting part,
wherein the fixing unit includes a body part, a fixing unit hook formed at an upper portion of one side of the body part, and a lower protrusion extending in a horizontal direction at a lower portion of or below the one side of the body part,
the mounting part includes a body, a movable hook part formed at an upper portion of one side of the body, and a lower groove formed at the lower portion of or below the one side of the body to correspond to the lower protrusion, and
hook coupling is performed by the movable hook part and the fixing unit hook at upper ends of the fixing unit and the mounting part, catching step coupling is performed at a lower portion in which the lower protrusion and the lower groove are formed, and thus the mounting part is fastened to the fixing unit,
wherein the movable hook part includes a pushing part and a mounting part hook,
the mounting part hook is formed to face the fixing unit hook, and when the mounting part hook is coupled to the fixing unit hook, the mounting part is fastened to the fixing unit,
wherein the mounting part further includes a guide groove positioned at an upper portion of the body to guide vertical movement of the movable hook part, and the movable hook part is configured to receive an upward spring force by a spring and a pin at a lower end thereof, and
when the pushing part is pushed, the hook coupling is released.
2. The automated liquid handling system of claim 1, further comprising:
a catching step formed at the lower groove, and
a catching boss protruding upward at an end of the lower protrusion,
wherein the lower protrusion extends from the lower portion of the one side of the body part to support the catching step from a lower side of the catch step, and
wherein the catching boss is configured to be inserted into a catching groove of the mounting part and in contact with the catching step, and thus horizontal movement of the mounting part is limited.
3. The automated liquid handling system of claim 1, wherein a fixing unit connector for electrical connection with the mounting part is disposed on the one side of the body part between the fixing unit hook and the lower protrusion,
a mounting part connector is disposed on the one side of the body to correspond to the fixing unit connector, and
when the hook coupling is performed, the fixing unit connector and the mounting part connector are coupled.
4. The automated liquid handling system of claim 1, further comprising:
a positioning groove formed between the fixing unit hook and the lower protrusion, and
a positioning boss formed on the one side of the body to correspond to the positioning groove.
5. The automated liquid handling system of claim 1, further comprising:
a catching step formed in the lower groove for accommodating one end of the lower protrusion therein, a catching groove formed in a rear surface of the catching step, and a catching boss protruding upward at an end of the lower protrusion,
wherein the catching step protrudes downward from an upper end of the lower groove,
the lower protrusion extends to support the catching step formed on one side of a lower portion of the mounting part in a state in which the mounting part is mounted, and the catching boss is inserted into the catching groove in the rear surface of the catching step, supports the mounting part from below, and is seated.
6. An automated liquid handling system comprising:
a transfer robot unit;
a fixing unit fixed to the transfer robot unit to move integrally with the transfer robot unit; and
a handling module which has a mounting part to be detachably mounted on the fixing unit and is configured to be detachably installed on the fixing unit by the mounting part,
wherein the fixing unit includes a body part, a fixing unit hook formed at an upper portion of one side of the body part, and a lower protrusion extending in a horizontal direction at lower portion of or below the one side of the body part,
the mounting part includes a body, a movable hook part formed at an upper portion of one side of the body, and a lower groove formed at lower portion of or below the one side of the body to correspond to the lower protrusion, and
hook coupling is performed by the movable hook part and the fixing unit hook at upper ends of the fixing unit and the mounting part, catching step coupling is performed at a lower portion in which the lower protrusion and the lower groove are formed, and thus the mounting part is fastened to the fixing unit,
wherein the handling module includes a motor driving unit, and
when the handling module is mounted on the fixing unit, connector coupling is performed without a separate cable so that electrical connection is performed, and the motor driving unit is connected to a motor controller through a connector and is driven by control of the motor controller.

* * * * *